United States Patent [19]

Toshiaki et al.

[11] Patent Number: 4,877,214

[45] Date of Patent: Oct. 31, 1989

[54] HOLDING DEVICE OF MIRROR ELEMENT FOR REARVIEW MIRROR

[75] Inventors: Kikuchi Toshiaki; Toshihiro Mochizuki; Yasutoshi Ito; Tohru Yamana, all of Shizuoka, Japan

[73] Assignee: Murakami Kaimeido Co., Ltd., Shizuoka, Japan

[21] Appl. No.: 143,447

[22] Filed: Jan. 12, 1988

[30] Foreign Application Priority Data

Jan. 13, 1987 [JP] Japan ................................ 62-2359

[51] Int. Cl.$^4$ ............................................... A47G 1/24
[52] U.S. Cl. ...................................... 248/483; 350/637
[58] Field of Search ...................... 248/481, 482, 483; 350/605, 606, 611, 633, 634, 637, 636

[56] References Cited

U.S. PATENT DOCUMENTS

| 2,604,818 | 7/1952 | Morgenstern | 248/483 |
| 3,005,385 | 10/1961 | Meade | 350/637 |
| 4,101,205 | 7/1978 | Bos | 248/481 X |
| 4,522,310 | 6/1985 | Mikic | 248/221.3 X |
| 4,632,525 | 12/1986 | Hayashi | 248/481 X |
| 4,678,295 | 7/1987 | Fisher | 350/637 X |
| 4,693,571 | 9/1987 | Kimura | 350/637 X |
| 4,701,037 | 10/1987 | Bramer | 350/637 |
| 4,764,004 | 8/1988 | Yamada | 248/483 X |

Primary Examiner—J. Franklin Foss
Attorney, Agent, or Firm—Michael J. Striker

[57] ABSTRACT

A holding device of a mirror element for rearview mirror includes an actuator unit for tiltably inclining a mirror, and a mirror element mounted through a pivot plate on the actuator unit. The mirror element has a mirror plate and a mirror holder, and an aperture of the size capable of engaging at least the central portion of the pivot plate at the center of the mirror holder. Hook type latch means is provided at the mirror holder and the upper portion of the pivot plate, and pawl engaging means utilizing undercuts are formed at the lower portion. The pivot plate is mounted by the supporting means of the actuator unit to form a subassembly. After the subassembly is fixed to the mirror body, the hook of the mirror element is engaged with the pivot plate, and the pawl is engaged while rotating the mirror element downward at the latch as a center to associate the mirror assembly.

11 Claims, 6 Drawing Sheets

HOLDING DEVICE OF MIRROR ELEMENT FOR REARVIEW MIRROR

FIELD OF THE INVENTION

This invention relates to a rearview mirror for a motor vehicle. Particularly, the invention relates to a structure for holding a mirror element in a rearview mirror for automatically adjusting the tilting angle of a mirror by means of electric motor-driven remote control.

DESCRIPTION OF THE PRIOR ART

A rearview mirror mounted outside a motor vehicle for adjusting the angle of reflection of the mirror from the interior of a compartment has been known. An electric motor-driven remote control type actuator unit fixed to a mirror body has two electric motors for adjusting the angle or reflection of the mirror at both vertical and horizontal angles, and a drive transmission. Supporting means for tiltably supporting a mirror element is provided at the center in the rear housing of the actuator unit. The supporting means has movable pivots at positions disposed at a predetermined distance in a direction crossing at a right angle from the center at the supporting means. When the electric motor is driven, either one or both of the movable pivots is axially movable back and forth through the drive transmission to tilt the mirror element at the supporting means as a center.

An ordinary supporting means has a semispherical socket formed in the rear housing, and a spherical pivot projected on the back surface of a mirror holder and engaged with the spherical socket. This supporting means does not have sufficient pivot holding force, and a chatter occurs at a mirror surface while the vehicle is traveling. It is considered to increase the diameters of the pivot and the socket to strengthen the holding force so as to prevent the chatter from occurring at the mirror, but the distance between the actuator and the mirror element is lengthened to be unstable, and the mirror body is unnecessarily increased unpreferably in size.

Then, a system having a spherical segment-shaped pivot provided on the back surface of a mirror holder and engaged with a socket including a zone-of-sphere-shaped recess formed in the rear housing of an actuator unit has been proposed as disclosed in Japanese Utility Model Publication No. 37857/1985. The mirror supporting means has larger diameters than those of the conventional spherical pivot and the recess spherical socket, low height of the sphherrical segment so that the distance between the actuator unit and the mirror element is not so increased. The system is advantageous in that the recess is formed at the center of the spherical segment-shaped pivot, a spherical segment-shaped cap is engaged with the recess, a tapping screw is penetrated through a helical spring with the recess, clamped to the center of the socket having the zone-of-sphere-shaped recess, and the mirror element can be supported with desired engaging torque by controlling the clamping force. However, in this system, a threaded cylinder is integrally formed at the center of the zone-of-sphere-shaped recess of the rear housing and the threaded cylinder is not engaged with a front housing. Therefore, its rigidity is less, and this system does not have a structure for preventing a chatter from occurring at a mirror. Since a screw must be penetrated through the center of the spherical segment-shaped pivot from the surface of the mirror holder before mounting a mirror glass, clamped to the socket of the rear housing side to be associated, and the mirror glass must be then bonded to the surface of the mirror holder, associating procedure becomes complicated.

The inventors have disclosed a rearview mirror having the following supporting structure in Japanese Utility Model Publication No. 40357/1985. More specifically, a mirror plate is bonded to a mirror holder at the center of which is formed with a punched hole to construct a mirror element, and a holder plate which can be engaged with the punched hole of the mirror holder is prepared as another component. This holder plate has a center socket at its center, and small sockets for engaging movable pivots in a direction perpendicular to each other at the center socket as a center. The center pivot and the movable pivots of an electric motor-driven remote control unit side are respectively engaged with the center socket and the small sockets of the holder plate. Thus, after the holder plate is supported to the electric motor-driven remote control unit, the mirror element is approached to the holder plate, and the holder plate is engaged with the punched hole formed at the mirror holder to associate the entire mirror. Since this mirror employs a pivot and socket supporting type, the holder plate does not have sufficient pivot holding force, and since the holder plate is merely engaged with the undercut formed at the periphery and the punched hole of the mirror holder, the engaged portion is easily disengaged due to a vibration or an impact while the vehicle is traveling to cause the mirror element to be possibly removed.

SUMMARY OF THE INVENTION

It is therefore an object of this invention to provide a holding device of a mirror element for a rearview mirror which can remarkably simplify the adjustment of a holding force.

It is another object of this invention to provide a holding device of a mirror element for a rear view mirror which can be readily associated.

It is still another object of this invention to provide a holding device of a mirror element for a rearview mirror having sufficient mirror element holding strength.

It is still another object of the invention to provide a holding device of a mirror element for a rearview mirror in which the rigidity of an actuator housing of the mirror element supporting portion is enhanced to prevent the mirror element from vibrating.

In order to achieve the objects of the invention and to overcome the problems of the prior art, the holding device of a mirror element for rearview mirror of the invention includes an actuator unit for adjusting the inclining angle of a mirror, a mirror element including a mirror plate and a mirror holder for supporting the mirror element, a pivot plate removably engaged with the back surface of the mirror holder, and supporting means for supporting the pivot plate to the actuator unit with a predetermined engaging torque. The upper portion of the mirror element has hook type latch means for engaging the pivot plate, and the lower portion of the mirror element has pawl engaging means.

The supporting means has a zone-of-sphere-shaped central socket formed at the front housing of the actuator unit, a threaded cylinder protruded to the center of the socket, a spherical segment-shaped pivot formed at the mirror element side to engage with the central socket, a spherical recess surface formed at the central of the spherical segment-shaped pivot, and a tapping screw penetrated through a helical spring to the threaded cylinder. A relatively large aperture is formed at the center of the mirror holder at the mirror element, and a pivot plate with the spherical segment-shaped pivot can be detachably engaged with the aperture. The surface of the mirror holder is firmly secured with the mirror glass. When assembling the rearview mirror, an intermediate assembly in which a desired engaging torque is adjusted by adjusting the clamping of the tapping screw while associating in advance the pivot plate with the actuator unit is contructed. The intermediate assembly thus adjusted is mounted directly on the mirror body or in a frame in the mirror body, the mirror element is approached to the pivot plate of the actuator side, the aperture of the mirror holder is engaged with the pivot plate by the hook type engaging means at the upper portion of the mirror element, and the pawl engaging means of the lower portion of the mirror element is simultaneously engaged. After thus engaging, when the mirror plate might be damaged or scratched during use, only the mirror element is removed, a mirror element of the same type prepared separately is mounted on the pivot plate as described above to recover the rearview mirror similarly a new one.

The actuator unit is formed by engaging the front housing and the rear housing as described above. The threaded cylinder of the supporting means is formed on the upper surface of the cylinder of a height reaching from the inner wall of the front housing to the inner wall of the rear housing, and protruded at the center of the zone-of-sphere-shaped socket. The spherical segment-shaped pivot of the pivot plate side is engaged with the zone-of-sphere-shaped socket, the cap is engaged within the spherical segment-shaped pivot, and the tapping screw is penetrated to the center of the threaded cylinder through the helical spring and clamped. A desired engaging torque is provided by adjusting the clamping force to provide sufficient mirror holding strength. The threaded cylinder is formed at the center of the upper surface of the cylinder projected integrally from the inner wall of the front housing, and the shoulder formed at the cylindrical upper edge of the root of the threaded cylinder is contacted with the inner wall of the rear housing. Thus, the front housing and the rear housing are closely contacted at the mirror element supporting portion by clamping the screw to maintain a high rigidity.

BRIEF DESCRIPTION OF THE DRAWINGS

A preferred embodiment of the invention is set fourth in the following description and shown in the drawings and is particularly and distinctly pointed out and set fourth in the appended claims.

DESCRIPTION OF THE PREFERRED EMBODIMENTS

Figure 1:
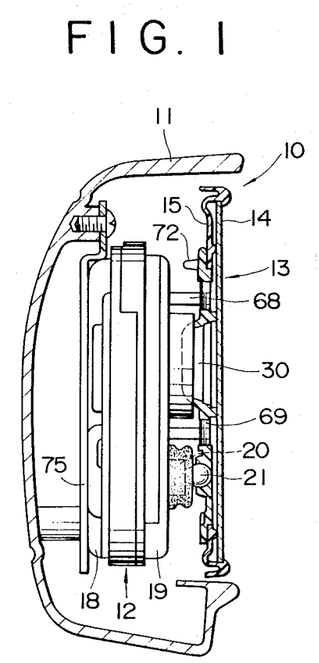
FIG. 1 is a sectional view of a rearview mirror according to a preferred embodiment of the present invention.

A remote controlled electric motor operated mirror assembly 10 is shown in FIG. 1, embodying the present invention.

The assembly 10 includes a mirror body 11 rotatably mounted on a base, an actuator unit 12 set in said mirror body 11, and a mirror element 13 mounted adjustably at a tilting angle in front of the actuator unit 12. Said mirror element 13 has a mirror plate 14, and a mirror holder 15 for holding the mirror plate 13. A pivot plate 17 is tiltably mounted through supporting means at the rear side of the actuator unit 12, and an aperture 16 is opened at the center of the mirror holder 15, and the pivot plate 17 is detachably mounted.

Figure 2:
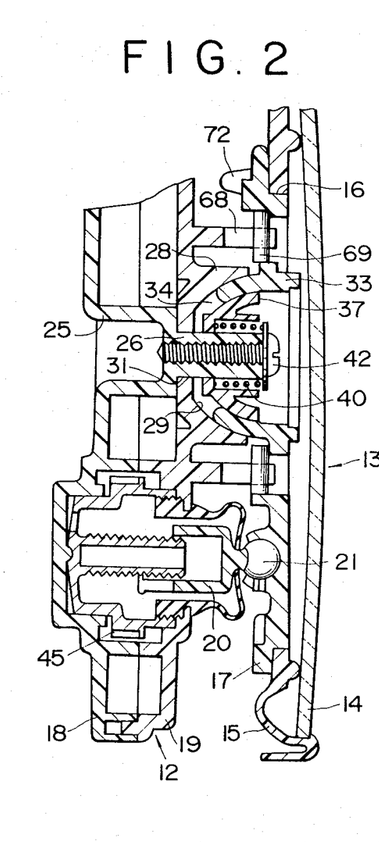
FIG. 2 is an enlarged sectional view of a mirror element holding means.

The actuator unit 12 is contructed, as shown in FIG. 2, to separably engage a front housing 18 and a rear housing 19, and has therein two sets of electric motors, a worm for forming a drive transmission, and a worm wheel. At the center of the rear housing 19 is provided a double socket-type supporting means 30 to be described later to tiltably support the mirror element 13. The worm wheel 25 of the drive transmission is disposed in the housing of the position separated at a distance at a right angle at the supporting means 30 as a center. An adjusting nut 20 is attached to each worm wheel 45, and a pivot 21 provided at the end of the adjusting nut 20 is engaged with a spherical seat 22 formed on the back surface of the pivot plate 17. When any of the electric motors is normally or reversely rotated, the adjusting nut 20 moves back and forth through the drive transmission, and the angle of reflection of the mirror is adjusted at vertical or horizontal angle.

The supporting means 30 includes, as disclosed in Japanese Utility Model Application No. 180488/1986, a threaded cylinder 26 protruded longer than the thickness of the housing from the front housing 18, and a double ball and socket structure formed at the pheriphery of the threaded cylinder.

As shown in FIG. 2, a cylinder 25 of the height arriving from the front housing 18 for forming the actuator unit 12 at the inner surface of the rear housing 19, and the threaded cylinder 26 is penetrated via the through-hole 31 of the bearing seat 28 formed on the rear housing 19 at the center of the cylinder 25. The bearing seat 28 has a recess spherical surface 29 for forming a zone-of-sphere-shaped recess for receiving a hollow pivot 33 of the side of the pivot plate 17, and the lower surface of the bearing seat 28 is contacted with the shoulder 32 of the cylinder 25 to protrude the threaded cylinder 25 penetrating the through-hole 31 from the center of the recess spherical surface 29 upward. A hollow spherical segment-shaped pivot 33 having a through-hole 34 at the top is formed at the center of the pivot plate 17.

A spherical segment-shaped cap 37 is engaged with the recess spherical surface 35 of the pivot 33. This cap 37 includes a hollow portion 38 for containing a helical spring 40 and a through-hole 39 for inserting a tapping screw 42 at the bottom of the hollow portion 38, and the pivot 33 is fixed to the threaded cylinder 26 protruded from the side of the mirror holder by a helical spring 40 and a tapping screw with a washer in the hollow portion 38.

Figure 3:
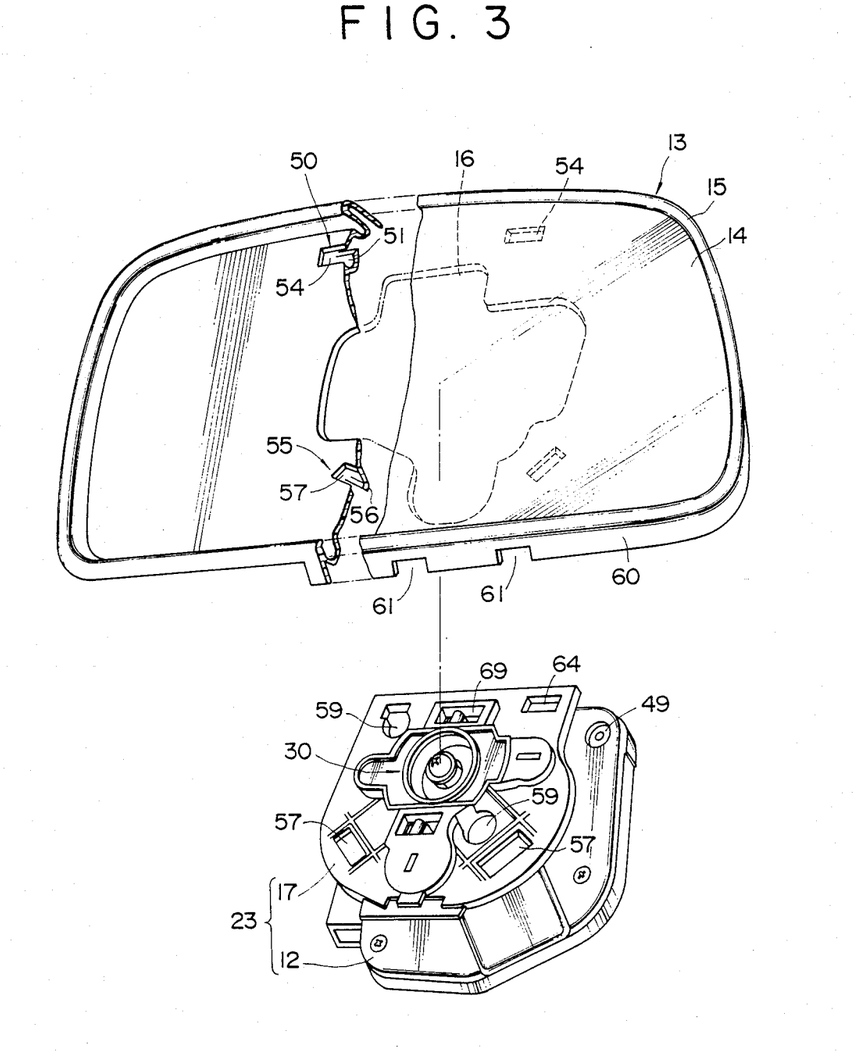
FIG. 3 is an exploded assembling view of the similar holding device.

FIG. 3 is an exploded perspective view of the mirror element 13 and a subassembly 23. The mirror plate 13 has the mirror element 14 engaged with or bonded to the mirror holder 15 having the aperture 16 at the center as described above. The subassembly 23 has the pivot plate 17 tiltably mounted on the actuator unit 12 through the supporting means 30.

In order to mount the mirror element 13 on the pivot plate 17 of the subassembly 23 secured to the base plate 75 of the mirror body 11, the thick portion 47 of the pivot plate 17 is engaged with the aperture 16 of the mirror holder side by utilizing hook type latch means 50 and pawl engaging means 55 provided between the mirror holder 15 and the pivot plate 17, a peripheral edge thin portion 48 is closely contacted with the back surface of the mirror holder 15, and assembled. In order to secure the subassembly 23 to the base plate 75, the actuator unit 12 has a plurality of screw penetrating holes 49 as shown in FIG. 3. Three screw penetrating holes 49 are ordinarily used. In FIG. 3, only one screw penetrating hole 49 is illustrated, but the remaining two screw penetrating holes 49 are opened at the portions directly under openings 59, 59 formed at the pivot plate 17 in the thicknesswise direction of the actuator unit 12 (not shown). The hook type latch means 50 has a hook 51 formed at the upper portion on the back surface of the mirror holder 15, and a cylindrical supporting rod portion 53 formed at the pivot plate 17. The pawl engaging means 55 has a pawl 56 protruded from the lower portion of the back surface of the mirror holder 15, and a rectangular opening 57 formed at the pivot plate 17. In FIG. 3, reference numeral 60 designates a skirt formed at the peripheral side of the mirror holder, and numeral 61 designates a tool inserting cutout for separating the mirror element 13 from the mirror assembly 23 as will be described later.

Figure 4:
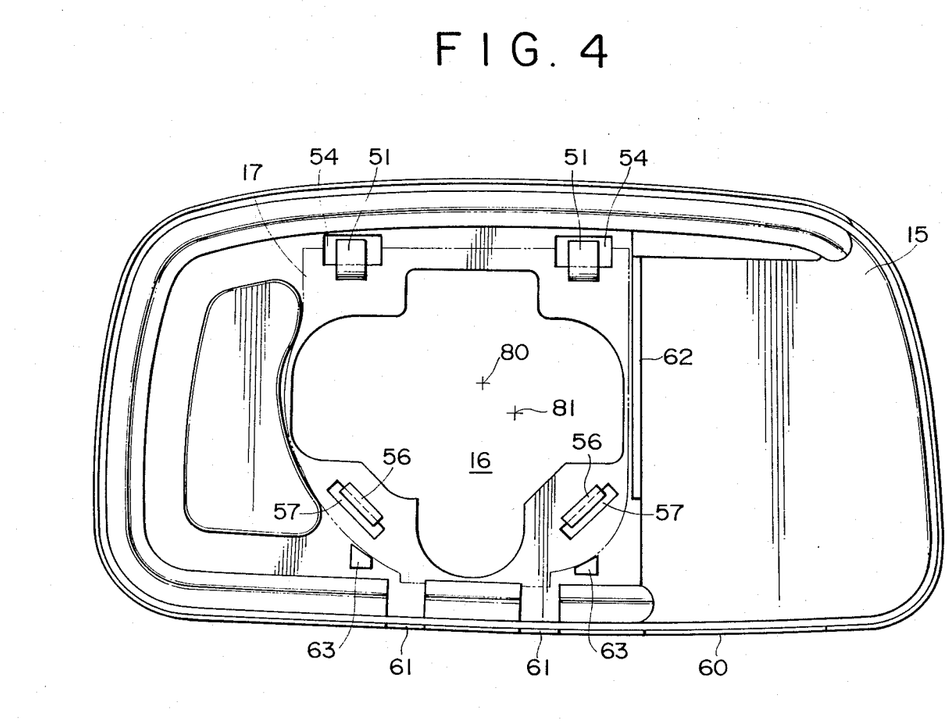
FIG. 4 is a back side view of the mirror element.
Figure 8:
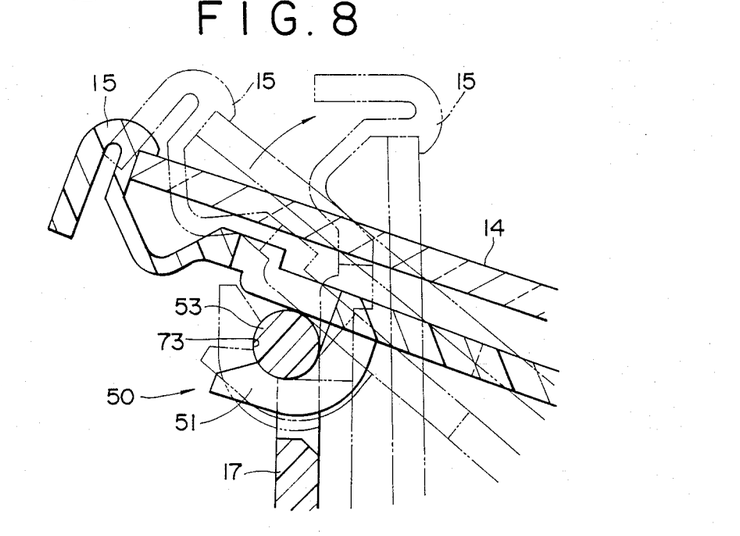
FIG. 8 is an enlarged sectional view of latch means of the invention.
Figure 9:
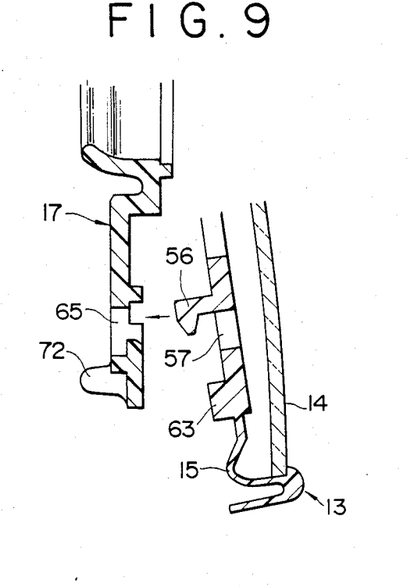
FIG. 9 is an enlarged sectional view of pawl engaging means in operation.
Figure 10:
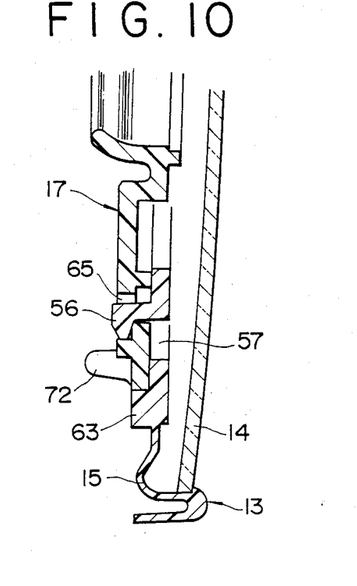
FIG. 10 is a sectional view of the state that the pawl engaging means completely engaged.

FIG. 4 shows the back side surface of the mirror holder 15. The aperture 16 of substantially thick cross shape is opened at the center of the back surface of the mirror holder 15 to engage the thick portion 47 of the pivot plate 17. A pair of rectangular openings 54 are formed at the upper portion of the back surface of the mirror holder 15, and hooks 51, 51 as shown in FIG. 8 are formed at the lower side of the mirror holder 15. A pair of narrow rectangular openings 57, 57 having an inclination of approx. 45° with respect to the center are formed correspondingly at the lower positions, and undercut pawls 56, 56 as shown in FIG. 9 are protruded from the upper sides of the openings 57, 57, respectively. A positioning projecting strip 62 is formed longitudinally near the right hook 51 and pawl 56 for guiding the right end face of the pivot plate 17, and projections 63, 63 are formed at the lower portions of the openings 57, 57, as shown in FIGS. 9 and 10, for guiding the lower bent portions 67, 67 of the pivot plate 17. In FIG. 4, reference numeral 80 designates the center of pivot, and numeral 81 designates the center of the mirror.

Figure 5:
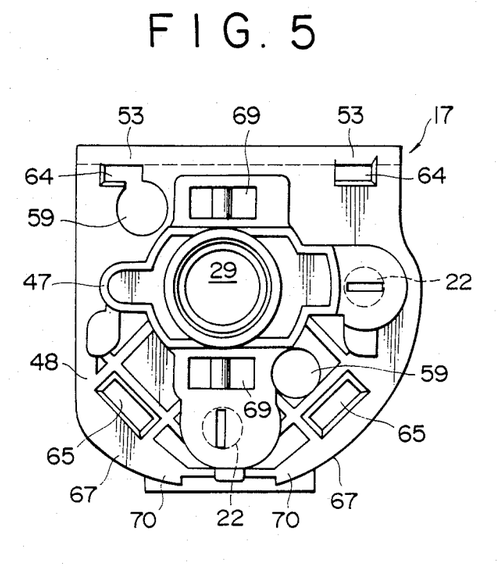
FIG. 5 is a front view of a pivot plate of the invention.
Figure 6:
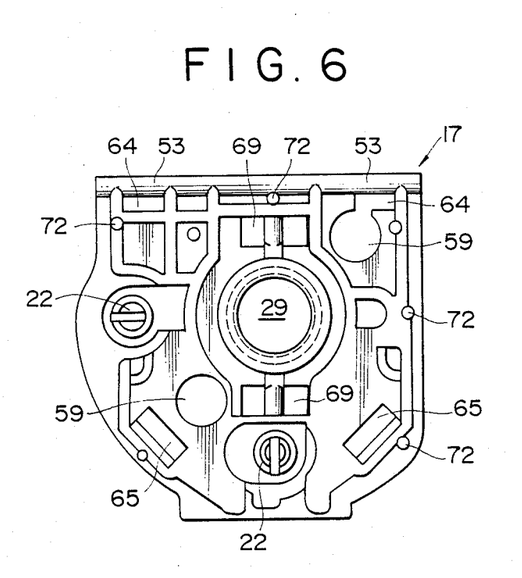
FIG. 6 is a back side view of the pivot plate.

FIG. 5 is a front view of the pivot plate 17, and FIG. 6 is a back side surface of the pivot plate 17. The pivot plate 17 is formed at the upper and left sides in FIG. 5 to be formed perpendicularly to each other and at the remaining portion except the partial lower linear side to be formed substantially in a circular-arc shape. The hollow spherical segment-shaped pivot 33 is formed at the center of the plate 17 as described above, and formed at the periphery of the pivot 33 with the thick portion 47 projected in a deformed cross shape. Antirotation retainers 69, 69 of the shape that a rod is disposed at the center of the rectangular opening are formed at the upper and lower positions near the hollow spherical segment-shaped pivot 33 of the thick portion 47. The retainers 69, 69 are engaged with a yoke-like anti-rotation piece 68 protruded from the rear housing 19 as shown in FIG. 2. A stepped thin portion 48 is formed at the periphery of the thick portion 47, and rectangular openings 64, 64 are formed at the upper right and left sides, a supporting rod 53 is provided at the openings 64, 64 is such a manner that the left opening 64 communicates with the openings 59. Rectangular openings 65 are so opened at the right and left positions at an angle of 45° with the pivot 33 of the supporting means 30 as a center as to engage the pawls 56 of the mirror holder side. A surface 70 to be contacted with the end of a tool to be inserted when the mirror element 13 is separated from the subassembly 23 is formed near the lowermost side. FIG. 6 is a back side surface of the pivot plate 17, i.e., the surface opposed to the actuator unit 12, illustrating that sockets 22, 22 with slots for engaging the moveable pivots 21 at the top of the adjusting nut 20 of the actuator side are formed at the positions perpendicular thereto at the hollow spherical segment-shaped pivot 33 as a center and stoppers 72 are formed for restricting the angle of the mirror in contact with the rear housing 19 when adjusting the inclining angle of the mirror at a plurality of positions thereon.

The operation of the holding device of this embodiment will be described.

The mirror assembly 10 as shown in FIG. 1 is assembled as below. The hollow spherical segment-shaped pivot 33 of the pivot plate 17 is first engaged with the recess spherical surface 29 formed on the rear housing 19 of the actuator unit 12, and the movable pivot at the top of the actuator side adjusting nut 20 is simultaneously engaged with the spherical seat 22. Then the spherical segment-shaped cap 37 is engaged within the recess spherical surface 35 of the pivot 33, and clamped with the threaded cylinder 26 by the helical spring 40 and the tapping screw 42 with washer. The pivot plate 17 is mounted by suitable torque by means of the elastic strength of the spring 40 and the clamping force of the screw 42.

Figure 7:
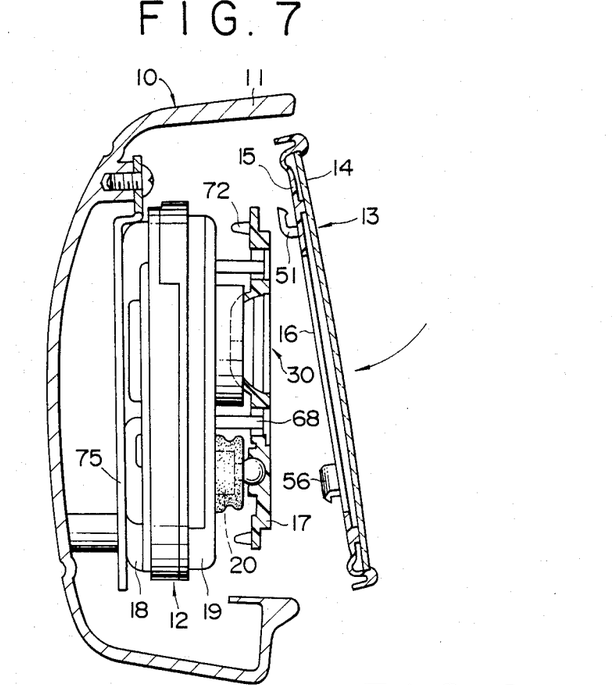
FIG. 7 is a side view of the state that the mirror element is engaged with the pivot plate.

The subassembly 23 in which the pivot plate 17 is mounted in the actuator unit 12 as described above is fixed to the base plate 75 in the mirror body 11. When fixing, as has been described with respect to FIG. 3, screws (not shown) are inserted into the screw penetrating holes 49 opened at the actuator unit 12 and clamped. Thereafter, as shown in FIG. 7, the mirror element 13 is inclined and approached to the pivot plate 17. Subsequently, as designated by solid lines in FIG. 8, the right and left hooks 51 of the mirror body side are lightly engaged with the supporting rod 53 of the pivot plate 17, the mirror element 13 is rotated clockwise in FIG. 8 at the supporting rod 53 as a center, and gradually completely latched to the supporting rod 53 of the hook 51 while increasing the engaging degree with the rod 53. The lower portion of the mirror element 12 is engaged as shown in FIG. 10 after the pawls 56 are approached to the rectangular openings 65 as shown in FIG. 9, the thick portion 47 of the pivot plate side is resultantly engaged with the aperture 16 of the mirror holder side, the thin portion 48 is simultaneously closely contacted with the flat surface at the periphery of the aperture 15, and the bent part of the lower portion of the pivot plate is guided by the projections 63 of the mirror holder side to be correctly engaged.

Since the hook 51 has a circular-arc-shaped inner surface 73 to be contacted at approx. ⅓ of the circumference of the supporting rod 53 as shown in an enlarged view of FIG. 8, it is latched while rotating at the supporting rod 53 as a center. Even if the pawl 56 of the lower portion is removed at rotating time or at finishing time, its cock portion is not removed. Since the pawls 56 and the rectangular openings 65 have inclinations of 45° at the pivot 33 as a center, the pivot plate or the mirror holder can be under tension in a direction perpendicular to the lengthwise direction of the pawl until the pawls pass the undercut when engaging the pawls 56, the pawls are completely engaged with the rectangular openings after passing the undercut to firmly mount the pawls at the openings.

Figure 11:
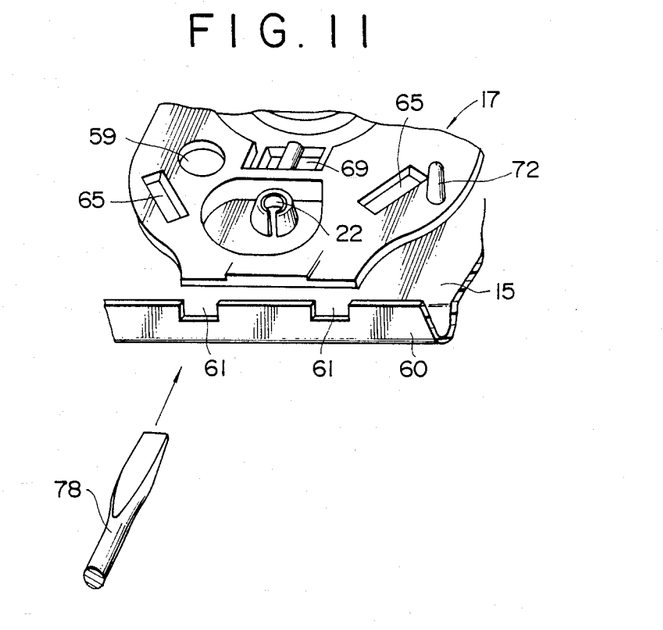
FIG. 11 is a partial perspective view of a pawl engaging portion when separating.

After assembling as described above, when it is necessary to remove the mirror element 13, as shown in FIG. 11, a tool 78, such as a screwdriver is inserted from the cutout 61 of the mirror holder 15 to the contacting surface 70 of the pivot plate 17, and the tool 78 is slightly raised to open the mirror element 13 and the lower portion of the pivot plate 17, thereby disengaging the pawl 56. Then, the mirror element is rotated reversely to an arrow in FIG. 8 to remove the latch of the hook 51, and the mirror element 13 is separated.

In the embodiment described above, the structures of the supporting means, the hook type latch means, and the pawl engaging means as well as the shapes of the mirror body and the pivot plate are not limited to the embodiment as shown in the drawings.

What is claimed is:

1. A holding device of a mirror element for a rearview mirror, comprising:
    a mirror element having a mirror plate and a mirror holder supporting said mirror plate, said mirror holder having a central area, an aperture portion formed at said central area, and an undercut, said mirror element having an angle of incline that is adjustable;
    actuator unit means for adjusting said angle of incline of said mirror element;
    supporting means formed at said actuator unit means for tiltable supporting said mirror element;
    pivot means mounted on said actuator unit means by said supporting means and mounted separately on said aperture portion, said pivot means having a pivot plate with an upper portion and a lower portion;
    hook type latch means for engaging said mirror holder with said upper portion of said pivot plate;
    pawl engaging means for engaging said undercut of said mirror holder with said lower portion of said pivot plate; and
    said mirror holder being formed with a cutout for inserting a separating tool at a skirt of a peripheral edge thereof and with a contacting surface to be contacted with an end of said separating tool.

2. A holding device of a mirror element for a rearview mirror, comprising:
    a mirror element having a mirror plate and a mirror holder supporting said mirror plate, said mirror holder having a central area, an aperture portion formed at said central area, and an undercut, said mirror element having an angle of incline that is adjustable;
    actuator unit means for adjusting said angle of incline of said mirror element;
    supporting means formed at said actuator unit means for tiltably supporting said mirror element;
    pivot means mounted on said actuator unit means by said supporting means and mounted separately on said aperture portion, said pivot means having a pivot plate with an upper portion and a lower portion;
    hook type latch means for engaging said mirror holder with said upper portion of said pivot plate;
    pawl engaging means for engaging said undercut of said mirror holder with said lower portion of said pivot plate, said actuating unit means being driveable, said supporting means having upper and lower portions, said actuator unit means including anti-rotation pieces protruded at said upper and lower portions of said supporting means so as to prevent said mirror element from rotating in a plane perpendicular to said mirror element when said actuating unit means is driven; and
    said holding device further comprising retainers arranged at said pivot plate for engaging said anti-rotation pieces.

3. A holding device of a mirror element for a rearview mirror, comprising:
    a mirror element having a mirror plate and a mirror holder supporting said mirror plate, said mirror holder having a central area, an aperture portion formed at said central area, and an undercut, said mirror element having an angle of incline that is adjustable;
    actuator unit means for adjusting said angle of incline of said mirror element;
    supporting means formed at said actuator unit means for tiltably supporting said mirror element;
    pivot means mounted on said actuator unit means by said supporting means and mounted separately on said aperture portion, said pivot means having a pivot plate with an upper portion and a lower portion;
    hook type latch means for engaging said mirror holder with said upper portion of said pivot plate;
    pawl engaging means for engaging said undercut of said mirror holder with said lower portion of said pivot plate;
    said actuator unit means including a front housing and a rear housing engaging each other, said front housing and said rear housing having inner walls facing each other, said supporting means including a cylinder extending longitudinally between said inner walls, said cylinder having an upper surface and a threaded cylinder protruding from said upper surface, said threaded cylinder having a periphery and a threaded center;
    said holding device further comprising:
    means for pivotably holding said front housing said rear housing together and including a spherical segment-shaped socket formed at said periphery of said threaded cylinder, a spherical segment-shaped pivot engaging said spherical segment-shaped socket and having a center area forming a recess, and a spherical segment-shaped cap engaging said recess; and
    means for adjusting a desired engaging torque and including a helical spring container in said cap and also including a tapping screw inserted through said helical spring and threaded into said center of said threaded cylinder.

4. A holding device of a mirror element for a rearview mirror, comprising:
a mirror element having a mirror plate and a mirror holder supporting said mirror plate, said mirror holder having a central area, an aperture portion formed at said central area, and an undercut, said mirror element having an angle of incline that is adjustable;
actuator unit means for adjusting said angle of incline of said mirror element;
supporting means formed at said actuator unit means for tiltably supporting said mirror element;
pivot means mounted on said actuator unit means by said supporting means and mounted separately on said aperture portion, said pivot means having a pivot plate with an upper portion and a lower portion;
hook type latch means for engaging said mirror holder with said upper portion of said pivot plate; and
pawl engaging means for engaging said undercut of said mirror holder with said lower portion of said pivot plate, each of said aperture portion and said pivot plate having upper right and left sides, said mirror holder having a back surface facing away from said mirror plate, said hook type latch means including hooks formed at said upper right and left sides of said aperture portion on said back surface of said mirror holder, said hook type latch means further including supporting rods formed at said upper right and left sides of said pivot plate so as to engage said hooks.

5. A holding device of a mirror element for a rearview mirror, comprising:
a mirror element having a mirror plate and a mirror holder supporting said mirror plate, said mirror holder having a central area, and aperture portion formed at said central area, and an undercut, said mirror element having an angle of incline that is adjustable;
actuator unit means for adjusting said angle of incline of said mirror element;
supporting means formed at said actuator unit means for tiltably supporting said mirror element;
pivot means mounted on said actuator unit means by said supporting means and mounted separately on said aperture portion, said pivot means having a pivot plate with an upper portion and a lower portion;
hook type latch means for engaging said mirror holder with said upper portion of said pivot plate; and
pawl engaging means for engaging said undercut of said mirror holder with said lower portion of said pivot plate, said supporting means having a center, said mirror holder having a back surface facing away from said mirror plate, said aperture portion having lower positions on said back surface of said mirror holder, said pawl engaging means including a pair of pawl members protruding at symmetrical positions inclined at 45° with respect to said center of said supporting means at said lower positions on said back surface of said mirror holder, said pawl engaging means further including a pair of openings formed at said pivot plate so as to engage said pawl members 6. The holding device as claimed in claim 5, wherein said openings have a rectangular shape.

7. A holding device of a mirror element for a rearview mirror, comprising:
a mirror element having a mirror plate and a mirror holder supporting said mirror plate, said mirror holder having a central area, an aperture portion formed at said central area, and an undercut, said mirror element having an angle of incline tht is adjustable;
actuator unit means for adjusting said angle of incline of said mirror element;
supporting means formed at said actuator unit means for tiltably supporting said mirror element;
pivot means mounted on said actuator unit means by said supporting means and mounted separately on said aperture portion, said pivot means having a pivot plate with an upper portion, a lower portion, and a lower peripheral edge;
hook type latch means for engaging said mirror holder with said upper portion of said pivot plate;
pawl engaging means for engaging said undercut of said mirror holder with said lower portion of said pivot plate; and
means for guiding said pivot plate during mounting and including a strip longitudinally projecting from said mirror holder into said aperture portion and including a pair of projections contacting said lower peripheral edge of said pivot plate.

8. A holding device of a mirror element for a rearview mirror, comprising:
a mirror element having a mirror plate and a mirror holder supporting said mirror plate, said mirror holder having a central area, an aperture portion formed at said central area, and an undercut, said mirror element having an angle of incline that is adjustable;
actuator unit means for adjusting said angle of incline of said mirror element and including front and rear housings engaging each other;
supporting means formed at said actuator unit means for tiltably supporting said mirror element;
pivot means mounted on said actuator unit means by said supporting means and mounted separately on said aperture portion, said pivot means having a pivot plate with an upper portion and a lower portion;
hook type latch means for engaging said mirror holder with said upper portion of said pivot plate;
pawl engaging means for engaging said undercut of said mirror holder with said lower portion of said pivot plate; and
means for restricting said angle of incline of said mirror element and including a plurality of stoppers extending from said pivot plate and being in contact said rear housing.

9. The holding device as claimed in claim 8, wherein said aperture portion has center with a substantially thick cross shape.

10. A holding device of a mirror element for a rearview window, comprising:
a mirror element including a mirror plate and a mirror holder supporting said mirror plate, said mirror holder having a central area, an aperture portion formed at said central area, and an undercut, said mirror element having an angle of incline which is adjustable;

actuator unit means for adjusting said angle of incline of said mirror element;

a pivot plate for connecting said mirror element with said actuator unit means to enable adjustment of said angle of incline of said mirror element by said actuator unit means, said pivot plate having an upper portion, a lower portion and a portion mounted on said aperture portion of said mirror holder, said actuator unit means including means for tiltably supporting said pivot plate;

hook type latch means for engaging said mirror holder with said upper portion of said pivot plate; and pawl means for engaging said undercut with said lower portion of said pivot plate.

11. The holding device as claimed in claim 10; and further comprising:

a base;

a mirror body supported by said base, said actuator unit means being fixed to said mirror body and including a front housing and a rear housing engaging each other.

* * * * *